S. M. TEETER.
ADJUSTABLE MEASURING DEVICE.
APPLICATION FILED MAR. 12, 1910.
984,452.
Patented Feb. 14, 1911.
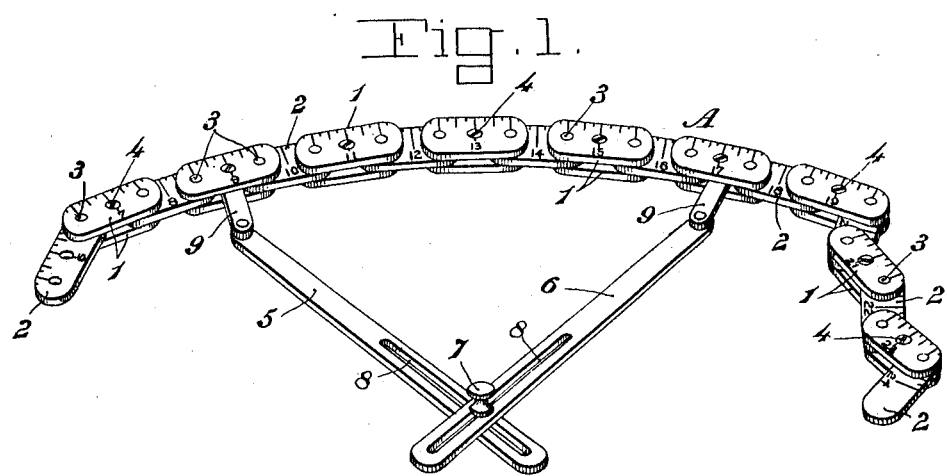
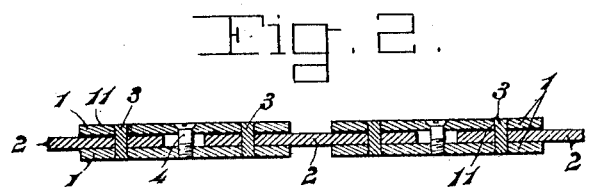
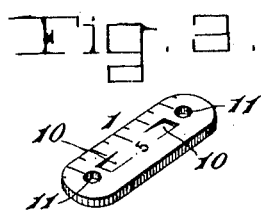
Inventor
Samuel M. Teeter
Witnesses

UNITED STATES PATENT OFFICE.

SAMUEL M. TEETER, OF WELLSTON, MISSOURI.

ADJUSTABLE MEASURING DEVICE.

984,452.  Specification of Letters Patent.  Patented Feb. 14, 1911.

Application filed March 12, 1910. Serial No. 548,841.

*To all whom it may concern:*

Be it known that I, SAMUEL M. TEETER, a citizen of the United States, residing at No. 6401 Wellsmar avenue, Wellston, in the county of St. Louis and State of Missouri, have invented new and useful Improvements in Adjustable Measuring Devices, of which the following is a specification.

This invention relates to a device which is adapted especially for taking measurements on concave, convex or irregular surfaces or to take the forms or contours of such surfaces, the instrument being especially adapted for mill men in obtaining the contour of arches, sub-bases and wainscotings, although the instrument may be useful to draftsmen, stair-builders, plumbers, carpenters, cabinet-makers and the like.

The invention has for one of its objects to provide an instrument of this character which is of comparatively simple and inexpensive construction, reliable and efficient in use, and readily adjustable.

Another object of the invention is the provision of a measuring and form taking device, consisting of a scale, composed of a plurality of hingedly connected links, together with adjustably connected cross-braces or arms that are connected with the scale adjacent the ends thereof so as to hold the scale in the position to which it has been adjusted in ascertaining the shape and measurement of curved or irregular surfaces.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a perspective view of the instrument. Fig. 2 is a longitudinal sectional view of several of the links forming the scale. Fig. 3 is a perspective view of a modified form of link.

Similar reference characters are employed to designate corresponding parts throughout the several views.

Referring to the drawings, A designates the scale of the instrument, which is composed of alternately arranged double and single links 1 and 2, which are connected together by pivots 3, the ends of the single links being disposed between the adjacent ends of juxtaposed double links and these links bear inch or other lineal unit marks and fractions thereof, and the scale can be of any desired length. The double links are adapted to be clamped to the single links by means of clamping screws 4, each of which pass through the center of both parts of a double link and by this means the scale will have sufficient rigidity to maintain the form to which it is adjusted in ascertaining the shape or contour of a surface. For assisting in maintaining the form of the scale after adjustment has been made, a pair of brace rods 5 and 6 are employed which have their outer ends arranged in overlapping or cross relation and connected by a thumbscrew 7 that forms a pivot, the screw passing through longitudinal slots 8 in the bars or members 5 and 6. The inner ends of the members 5 and 6 are hingedly connected with the scale by means of lugs or connecting pieces 9, which are fastened to the clamping screws 4 of any pair of double links. The points of connection between the members 5 and 6 and the scale can be varied by detaching the connecting pieces 9 from any pair of links and connecting them with another pair and in this manner the bracing members can be connected near to the ends or to the middle of the scale, it being, of course, necessary in making an adjustment to loosen the thumb-screw 7 for lengthening or shortening the distance between the screw and the inner ends of the members.

When the scale is to be made of thin metal links, the clamping screws 4 will be dispensed with and the links will be constructed as shown in Fig. 3, and in this case, spring tongues 10 are stamped out from the links at a point adjacent the pivot receiving openings 11 so that the tongues will form friction devices between the overlapping portion of adjacent links to thus prevent the links from having too free relative movement.

The instrument can be used for various irregular surfaces whether they be convex or concave and in using the instrument, it is merely necessary to loosen the thumb-screw 7 and place the scale against the surface to be measured or whose contour is to be ascertained and after this is done, the thumb screw is again tightenend so that the brace rods 4 and 5 will assist in maintaining the shape of the scale, and if a measurement is to be made, it can be done by the division marks on the scale so used.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the apparatus shown is merely illustrative and that such changes may be made when desired as are within the scope of the claims.

What I claim as new and desire to secure by Letters Patent; is;

1. An instrument of the class described comprising alternately arranged single and double links pivotally connected together, the single links having their ends disposed between adjacent double links and there being spaces between the ends of the single links, fastenings passing through the double links for clamping the latter in frictional engagement with the single links, connecting pieces adapted to be inserted in the spaces between the single links and to be secured to the double links by the said fastenings, and adjustable bracing means connected with the said connecting pieces.

2. An instrument of the class described, comprising a scale composed of hingedly connected links, a pair of connecting pieces adjustably attached to different links and both extending from the same side of the scale, rods having their inner ends hingedly connected with the said pieces and having their outer ends overlapping, the overlapping ends of the rods being longitudinally slotted, and a fastening passing through the slots for adjustably connecting the rods together.

3. An instrument of the class described, comprising alternately arranged single and double links pivotally connected together, clamping devices passing through the double links for frictionally engaging the same with the single links, connecting pieces adapted to be attached to the fastening devices of any pair of double links, brace rods hingedly connected with the said pieces, and arranged in angular relation and overlapping each other, and means for adjustably connecting the overlapping portions of the brace rods.

In testimony whereof I affix my signature in presence of two witnesses.

SAMUEL M. TEETER.

Witnesses:
H. B. SURKAMP,
MARY M. MURPHY.